United States Patent [19]
Murray

[11] Patent Number: 5,881,076
[45] Date of Patent: Mar. 9, 1999

[54] COMPARATOR UTILIZING REDUNDANCY

[75] Inventor: Robert J. Murray, Hillsboro, Oreg.

[73] Assignee: Intel Corporation, Santa Clara, Calif.

[21] Appl. No.: 682,108

[22] Filed: Jul. 17, 1996

[51] Int. Cl.$^6$ .................................................. G06F 11/00
[52] U.S. Cl. ........................ 371/49.1; 371/68.1; 326/82
[58] Field of Search ................................ 371/49.1, 49.2, 371/50.1, 37.6, 67.1, 68.1, 68.2, 71; 364/266.3, 266.4, 945.6; 395/185.05, 185.01, 185.06; 340/146.2; 326/82, 83, 85, 86, 87, 89, 91, 112, 124, 128

[56] References Cited

U.S. PATENT DOCUMENTS

| | | | |
|---|---|---|---|
| 4,426,699 | 1/1984 | Tanaka et al. .......................... | 371/68.1 |
| 4,617,664 | 10/1986 | Aichelmann, Jr. et al. ........... | 371/37.7 |
| 4,692,893 | 9/1987 | Casper .................................... | 395/875 |
| 4,694,274 | 9/1987 | Shimada et al. ...................... | 340/146.2 |
| 4,857,882 | 8/1989 | Wagner et al. ....................... | 340/146.2 |
| 5,130,578 | 7/1992 | Stone ..................................... | 341/123 |
| 5,319,348 | 1/1994 | Lee ........................................ | 340/146.2 |
| 5,341,314 | 8/1994 | Bennivenga et al. ................. | 371/68.1 |
| 5,590,361 | 12/1996 | Iwamura et al. ..................... | 395/800.32 |
| 5,619,642 | 4/1997 | Nielson et al. ....................... | 395/182.04 |
| 5,719,889 | 2/1998 | Iadanza ................................. | 371/49.3 |

*Primary Examiner*—Trinh L. Tu
*Attorney, Agent, or Firm*—Blakely, Sokoloff, Taylor & Zafman LLP

[57] ABSTRACT

A method and apparatus for comparing two N-bit digital numbers. The N bits from the two numbers are inputs to a comparator. In addition, a parity bit from each number is an input to the comparator. Thus, the logical distance between any two numbers as seen by the comparator is at least two.

11 Claims, 4 Drawing Sheets

COMPARATOR UTILIZING REDUNDANCY

FIELD OF THE INVENTION

The present invention relates to the field of digital comparator design; more particularly, the present invention relates to a method and apparatus for increasing the performance of comparators by using additional inputs to the comparators.

BACKGROUND OF THE INVENTION

Many circuits contain comparators that compare two digital numbers. For example, cache memory systems compare requested addresses with tags of data stored in the cache, and arithmetic units compare two numbers for a variety of reasons. When comparing two digital numbers, the number of bits that are different between two numbers is commonly referred to as the logical distance between the numbers.

In a typical comparator, the inputs consist only of the bits that represent two digital numbers to be compared. When the compared numbers have a logical distance of one, only one input drives the result output. For example, in a domino implementation where the output of the compare circuit is the output of a wired-OR configuration of transistors, the output of each bit comparison is coupled to a pull down transistor. Each pull down transistor is coupled between the output node and ground to pull the voltage level of the output node to ground at the appropriate times. When there is a logical distance of one between two numbers, only one pull down transistor is turned on.

Alternatively, a static implementation may also be used where the wired-OR configuration is replaced by a static OR gate. A static implementation works in a manner similar to the domino implementation discussed above except that each bit comparison output has associated with it a pull up transistor and a pull down transistor. When two differing bits are compared, the associated pull up transistor is turned off and the associated pull down transistor is turned on. When only one bit differs, only one transistor is used to pull down the output node.

Thus, the logical distance between two numbers is equivalent to the number of pull down transistors turned on to discharge the output node. A logical distance of one is the slowest case because only a single transistor is turned on the discharge the output node. Therefore, it would be desirable to have a comparator wherein the minimum logical distance between any two numbers as seen by the comparator is two.

SUMMARY OF THE INVENTION

A comparator utilizing redundancy is described. In order to compare two N-bit digital numbers, an N+1 bit comparator is used. The N bits from each number are input to the comparator. In addition, a parity bit from each of the numbers is input to the comparator performing the N+1 bit comparison. The parity bit input causes the logical distance between two numbers as seen by the comparator to be at least two.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

A comparator utilizing redundancy is described. In the following description, numerous details are set forth, such as specific gates and transistors, etc. It will be apparent, however, to one skilled in the art, that the present invention may be practiced without these specific details. In other instances, well-known structures and devices are shown in block diagram form, rather than in detail, in order to avoid obscuring the present invention.

Briefly, the present invention consists of additional inputs to a comparator. The additional inputs consist of parity bits from the two digital numbers being compared. The parity bits assure that the logical distance, as seen by the comparator, between any two numbers being compared is at least two. Because the parity bits of two numbers will differ when the number of bits that differ is an odd number, the logical distance between any two numbers that have an odd number of bits that differ increases by one.

The present invention is particularly useful in association with digital numbers that have a predetermined parity bit associated with them. For example, in cache memory systems where a parity bit is typically generated for each address for other purposes, the present invention offers a greater advantage than in circuits where a parity bit would have to be generated for comparison purposes.

Figure 1:
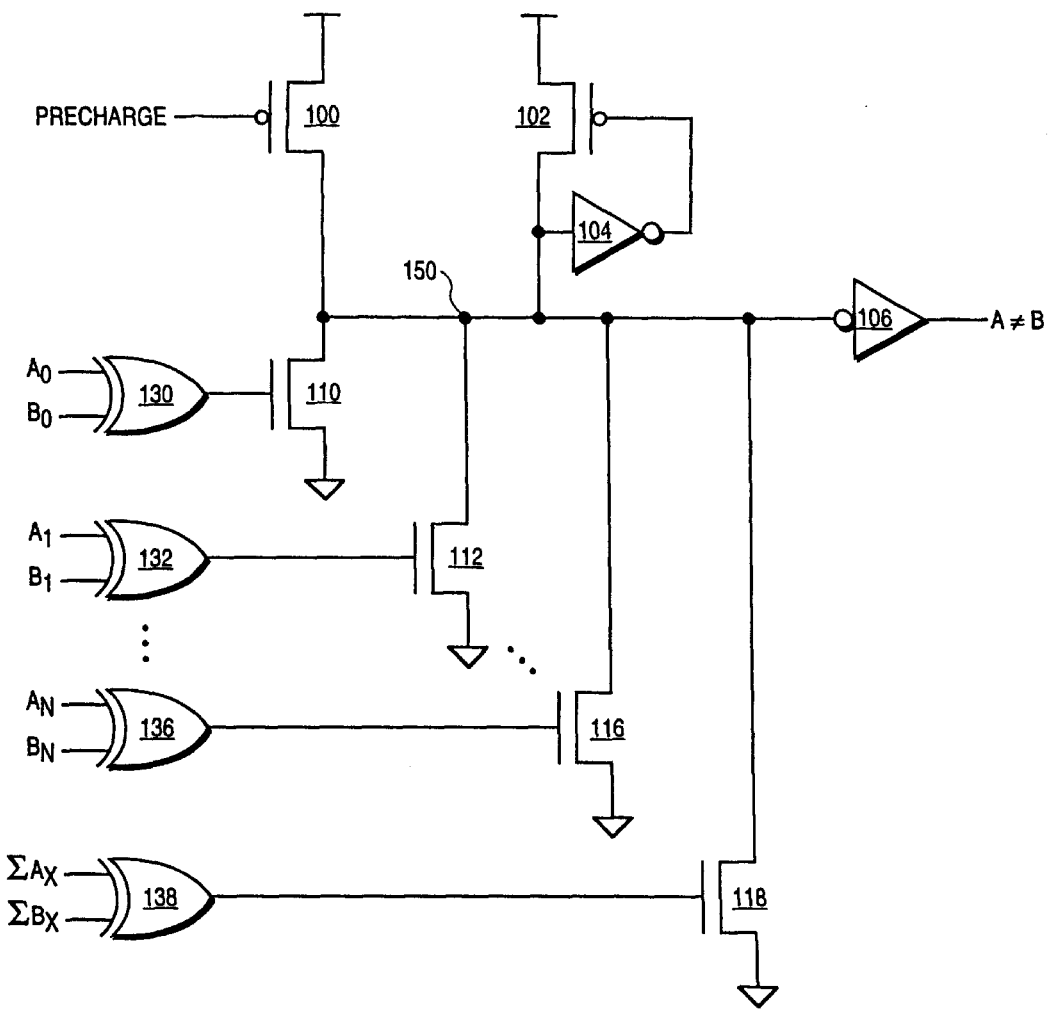
FIG. 1 is a circuit diagram of one embodiment of a domino implementation of a compare circuit according to the present invention.

FIG. 1 is a circuit diagram of a domino implementation of a comparator according to one embodiment of the present invention. Referring to FIG. 1, p-channel transistor 100 precharges node 150 prior to the comparison of two numbers A and B. P-channel transistor 102 and inverter 104 form a "keeper" to maintain the precharge level of a logical high at node 150. Precharging is known in the art and will not be described in greater detail. Inverter 106 inverts the logic level at node 150.

Exclusive OR (XOR) gates 130, 132 and 136 are configured to receive a bit from each digital number to be compared. Bits having the same numerical significance are input to the same XOR gate. For example, XOR gate 130 receives as its input the least significant bit of each of the numbers compared, $A_0$ and $B_0$. Similarly, $A_1$ and $B_1$ represent the next to least significant bits of A and B, respectively, and are the inputs to XOR gate 132. The bits of A and B are coupled in a similar manner up to $A_N$ and $B_N$, which represent the most significant bits of A and B, respectively. XOR gate 138 receives as inputs the parity bits of A and B, which are designated by $\Sigma A_X$ and $\Sigma B_X$, respectively. Parity may be either even or odd.

The output of each XOR gate 130, 132, 136 and 138 is coupled to the gate of a pull down transistor. Each pull down transistor 110, 112, 116 and 118 has a drain coupled to node 150 and a source coupled to ground. Thus, when node 150 has been precharged high, each pull down transistor is controlled by the output of the XOR gate to which it is coupled. When a pull down transistor turns on, the pull down transistor couples node 150 to ground. Node 150 discharges as current flows to ground through the pull down transistors that are turned on.

In an implementation without XOR gate 138 having as its input the parity bits of A and B, when two digital numbers that differ by one bit are compared, only one pull down transistor turns on. For example, if A and B differ by only the least significant bit, XOR gate 130 turns transistor 110 on and the remaining pull down transistors are turned off. Thus, the time required to discharge node 150 is determined by the current that flows through transistor 110.

With the addition of XOR gate 138 having as its inputs the parity bits of A and B, node 150 is discharged through at least two transistors for any two digital numbers that are different. For example, when A and B differ by the least significant bit, XOR gate 130 turns on pull down transistor 110. Transistor 118, which is coupled to XOR gate 138, also turns on. Using either even or odd parity, the parity bits of A and B will differ when the logical distance between A and B is one. Thus, when A and B differ by one bit, node 150 will be discharged through transistor 118 and transistor 110, which increases the rate at which node 150 discharges over discharging node 150 through a single pull down transistor.

When A and B differ by two bits, or have a logical distance of two, two of the XOR gates receiving the bits of A and B as inputs turn on their associated pull down transistors and node 150 is discharged through two pull down transistors. With a logical distance of two, XOR 138 does not turn transistor 118 on because the parity bits match. However, node 150 is discharged through two transistors, which is faster than discharging node 150 through a single transistor. Thus, using parity bits as an input to a comparator improves worst case performance of the comparator, which increases overall performance of the comparator.

Figure 2:
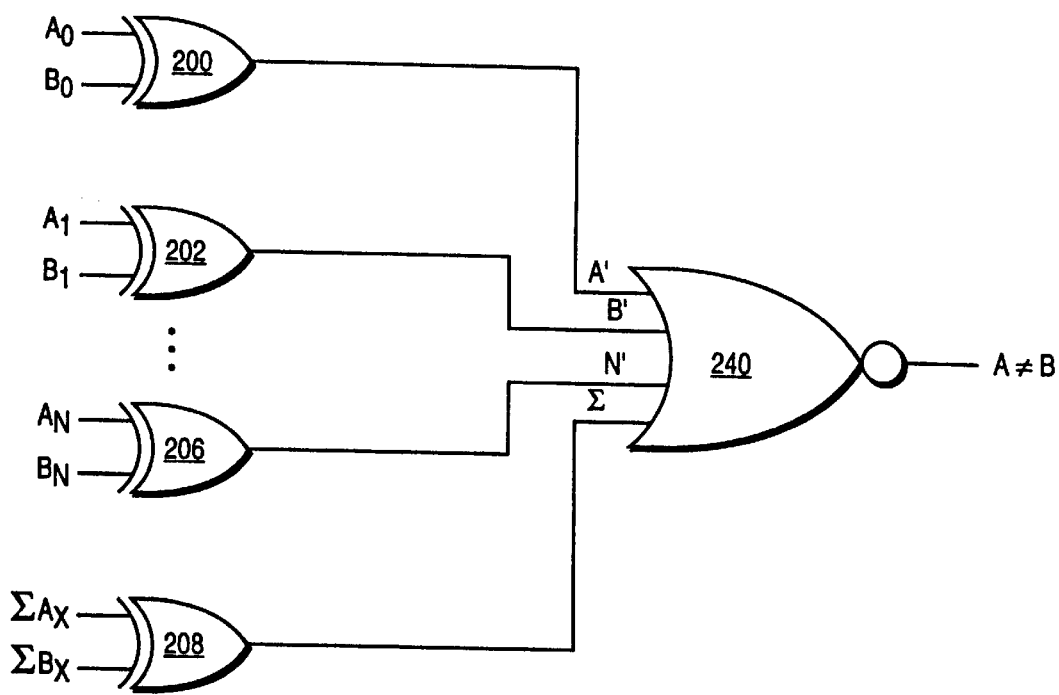
FIG. 2 is a circuit diagram of one embodiment of a static implementation of a compare circuit according to the present invention.

FIG. 2 is a circuit diagram of a static implementation of a comparator according to one embodiment of the present invention. The static implementation operates in a manner similar to the domino implementation. XOR gates 200, 202 and 206 receive bits of A and B and XOR gate 208 receives as inputs the parity bits of A and B. When one of the XOR gates indicates that one of the bit pairs differ, the output of NOR gate 240 is pulled to ground. In an implementation where parity bits of A and B are not used as inputs, a logical distance between A and B of one requires that a single input be used to discharge NOR gate 240. Thus, when XOR gate 208 receives as inputs the parity bits of A and B, the minimum logical distance between A and B as seen by the comparator is two, and at least two discharge paths are available to discharge NOR gate 240.

Figure 3:
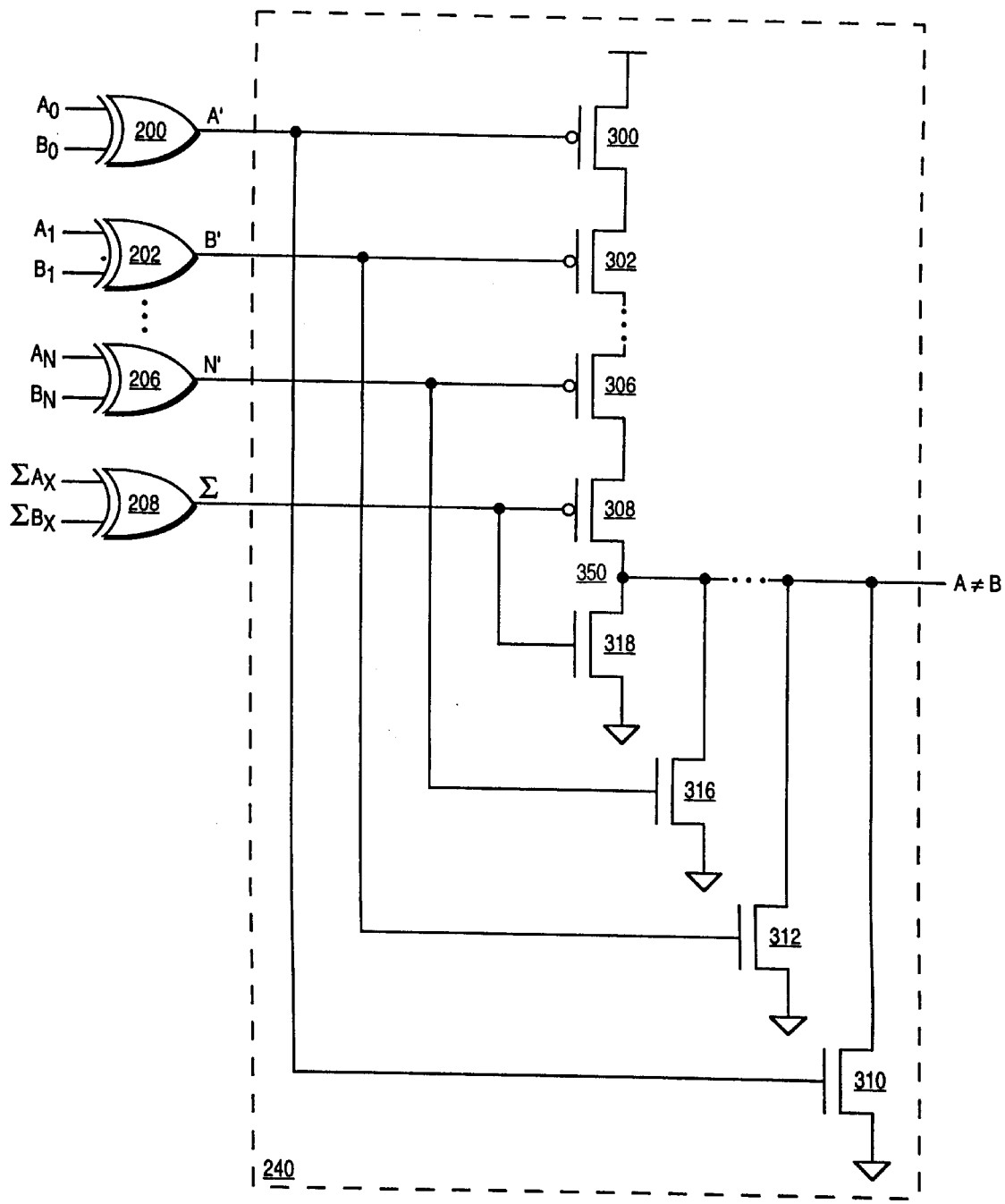
FIG. 3 is a circuit diagram of one embodiment of a static implementation of a compare circuit with the NOR gate at the transistor level according to the present invention.

FIG. 3 is a circuit diagram of a static implementation of a comparator with one embodiment of NOR gate 240 at the transistor level according to the present invention. When A and B are equal, the output of the XOR gates is low, which turns pull up transistors 300, 302, 306 and 308 on and turns pull down transistors 310, 312, 316 and 318 off. Thus, when A and B are equivalent, node 350 coupled to a voltage supply output and is at a high logic level.

When A and B differ, one or more pull up transistors are turned off and one or more corresponding pull down transistors are turned on. When any one of the pull up transistors is turned off, node 350 is not coupled the voltage supply output, and the one or more pull down transistors that are turned on pull node 350 to ground. Thus, the number of pull down transistors that are turned on determine the discharge current that flows from node 350 to ground and the time required to discharge node 350.

By including the parity bits of A and B as inputs to the comparator, the minimum logical distance as seen by the comparator between any two numbers is at least two, which assures that at least two pull down transistors are turned on for any comparison of differing numbers. Because the discharge current is increased in the worst case situation, the time required to obtain a result is decreased, which increases overall performance of the comparator.

Figure 4:
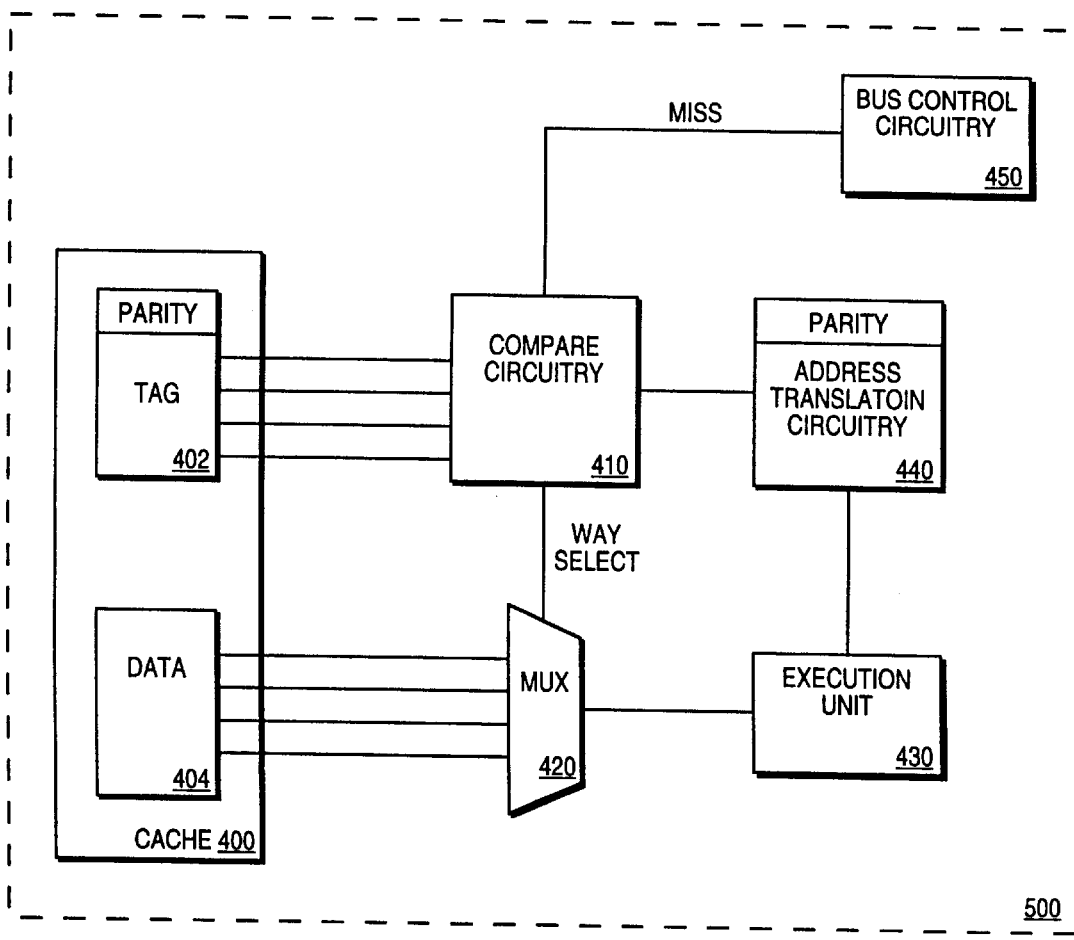
FIG. 4 is a block diagram of one embodiment of a processor containing a cache memory and a compare circuit according to the present invention.

FIG. 4 is a block diagram of one embodiment of a processor 500 containing a four-way set-associative cache memory and a compare circuit according to the present invention. Cache 400 comprises data memory 404, which stores the data to be used by processor 500 and tag circuitry 402, which contains tag data to uniquely identify corresponding data stored in data memory 404. Tag circuitry 402 also stores parity data associated with each address. Other cache configurations may also be used.

Address translation circuitry 440 translates virtual addresses to physical addresses that are used to access memory. Address translation circuitry 440 also outputs parity data for the addresses that are output to compare circuitry 410. Address translation circuitry 440 is coupled to compare circuitry 410 that contains one or more comparators utilizing redundancy according to one embodiment of the present invention. For example, the static or domino implementations discussed above may be included in compare circuitry 410.

Compare circuitry 410 is also coupled to tag circuitry 402 and compares an address received from address translation circuitry 440 to one or more addresses received from tag circuitry 402. Compare circuitry 410 shown in FIG. 4 receives four addresses from tag circuitry 402 because cache 400 is a four-way set-associative cache. The number of addresses received by compare circuitry 410 from tag circuitry is varied according to the configuration of cache 400.

Compare circuitry 410 has an output coupled to bus control circuitry 450 to request data from memory if the requested address is not found in cache 400. Compare circuitry 410 also has outputs to control multiplexor 420, which selects appropriate data from data memory 404 when the requested address is located in cache 400. The output of multiplexor 420 is coupled to execution unit 430.

The outputs of compare circuitry 410 that control multiplexor 420 are generated based on the outputs of the comparators contained in compare circuitry 410. The output of compare circuitry 410 selects data from data memory 404 that corresponds with the address supplied by address translation circuitry 440, if one of the addresses supplied by tag circuitry 402 matches the address supplied by address translation circuitry 440. Thus, comparators utilizing redundancy may be used to improve the performance of cache memories and processors.

Thus, a comparator utilizing redundancy has been described.

I claim:

1. A circuit for comparing two N-bit digital numbers, comprising an (N+1)-bit comparator wherein N bits of each digital number and a parity bit from each of the N-bit digital numbers are inputs to the comparator wherein the two N-bit digital numbers are coupled to 2N inputs of the (N+1)-bit comparator and the parity bit of each of the two N-bit digital numbers are coupled to two inputs of the (N+1)-bit comparator such that at least two current discharge paths exist when the two digital numbers are different.

2. An arrangement for comparing two N-bit digital numbers, comprising:
   N+1 pull down transistors having individual drains coupled to a common node and individual sources coupled to ground; and
   N+1 exclusive OR (XOR) gates each having an output coupled to a gate of one of the pull down transistors such that an exclusive OR condition turns on an associated pull down transistor to couple the common node to ground;
   wherein one of the plurality of XOR gates is coupled to receive a least significant bit of each of the two digital numbers, another in the plurality of XOR gates is coupled to receive a next to least significant bit of each of the two digital numbers, up to an Nth XOR gate coupled to receive a most significant bit of each of the two digital numbers, further wherein one of the plurality of XOR gates is coupled to receive a parity bit from each of the two digital numbers as an input the plurality of XOR gates and transistors coupled such that discharge paths exist through at least two transistors when the two digital numbers are different.

3. The arrangement of claim 2 further comprising a first pull up transistor coupled between a voltage supply output and the common node to precharge the commmon node.

4. The arrangement of claim 3, further comprising:
   a second pull up transistor coupled between a voltage supply output and the common node; and
   an inverter having an input coupled to the common node and an output coupled to a gate of the second pull up transitor.

5. A circuit for comparing two N-bit digital numbers, comprising:
   an N+1 input OR gate; and
   N+1 exclusive OR (XOR) gates each having an output coupled to an input of the OR gate;
   wherein one of the plurality of XOR gates is coupled to receive a least significant bit of each of the two digital numbers, another in the plurality of XOR gates is coupled to receive a next to least significant bit of each of the two digital numbers, up to an Nth XOR gate coupled to receive a most significant bit of each of the two digital numbers, further wherein one of the plurality of XOR gates is coupled to receive a parity bit from each of the two digital numbers as an input the plurality of XOR gates and the OR gate coupled such that at least two discharge paths exist when the two digital numbers are different.

6. A method for comparing two N-bit digital numbers, comprising:
   performing a bitwise comparison on the two digital numbers;
   performing a bitwise comparison on parity bits associated with the two digital numbers; and
   generating an output signal that indicates that the two digital numbers are different in response to the bitwise comparison of the two digital numbers and the bitwise comparison of the parity bits indicating the two digital numbers are different, wherein the output signal is generated using at least two discharge paths when the two digital numbers are different.

7. A cache memory, comprising:
   data stored in a memory array;
   tag information stored in a tag array;
   a compare circuit coupled to the tag array and receiving as an input a requested address, the compare circuit comprising:
      N+1 pull down transistors having individual drains coupled to a common node and individual sources coupled to ground; and
      N+1 exclusive OR (XOR) gates each having an output coupled to a gate of one of the pull down transistors such that an exclusive OR condition turns on an associated pull down transistor to couple the common node to ground;
   wherein one of the plurality of XOR gates is coupled to receive a least significant bit of each of two digital numbers, another in the plurality of XOR gates is coupled to receive a next to least significant bit of each of the two digital numbers, up to an Nth XOR gate coupled to receive a most significant bit of each of the two digital numbers, further wherein one of the plurality of XOR gates is coupled to receive a parity bit from each of the two digital numbers as an input, the plurality of XOR gates coupled such that at least two discharge paths exist when the two digital numbers are different; and
   a multiplexor coupled to the memory array and to the compare circuit, wherein the multiplexor is controlled by the compare circuit in response to a comparison of two digital numbers.

8. A cache memory, comprising:
   data stored in a memory array;
   tag information stored in a tag array;
   a compare circuit coupled to the tag array and receiving as an input a requested address, the compare circuit comprising:
      an N+1 input OR gate; and
      N+1 exclusive OR (XOR) gates each having an output coupled to an input of the OR gate;
   wherein one of the plurality of XOR gates is coupled to receive a least significant bit of each of two digital numbers, another in the plurality of XOR gates is coupled to receive a next to least significant bit of each of the two digital numbers, up to an Nth XOR gate coupled to receive a most significant bit of each of the two digital numbers, further wherein one of the plurality of XOR gates is coupled to receive a parity bit from each of the two digital numbers as an input, the plurality of XOR gates coupled such that at least two discharge paths exist when the two digital numbers are different; and
   a multiplexor coupled to the memory array and to the compare circuit, wherein the multiplexor is controlled by the compare circuit in response to a comparison of two digital numbers.

9. A processor, comprising:
   address translation circuitry; and
   a cache memory coupled to the address translation circuitry, the cache memory comprising:
      data stored in a memory array;
      tag information stored in a tag array;
      a compare circuit coupled to the tag array and receiving as an input a requested address, the compare circuit comprising:
         N+1 pull down transistors having individual drains coupled to a common node and individual sources coupled to ground; and
         N+1 exclusive OR (XOR) gates each having an output coupled to a gate of one of the pull down transistors such that an exclusive OR condition turns on an associated pull down transistor to couple the common node to ground;

wherein one of the plurality of XOR gates is coupled to receive a least significant bit of each of two digital numbers, another in the plurality of XOR gates is coupled to receive a next to least significant bit of each of the two digital numbers, up to an Nth XOR gate coupled to receive a most significant bit of each of the two digital numbers, further wherein one of the plurality of XOR gates is coupled to receive a parity bit from each of the two digital numbers as an input, the plurality of XOR gates coupled such that at least two discharge paths exist when the two digital numbers are different; and a multiplexor coupled to the memory array and to the compare circuit, wherein the multiplexor is controlled by the compare circuit in response to a comparison of two digital numbers.

10. A processor, comprising:

address translation circuitry; and a cache memory coupled to the address translation circuitry, the cache memory comprising:

data stored in a memory array;

tag information stored in a tag array coupled to the memory array; and a compare circuit coupled to the tag array and receiving as an input a requested address, the compare circuit comprising:

an N+1 input OR gate; and

N+1 exclusive OR (XOR) gates each having an output coupled to an input of the OR gate;

wherein one of the plurality of XOR gates is coupled to receive a least significant bit of each of two digital numbers, another in the plurality of XOR gates is coupled to receive a next to least significant bit of each of the two digital numbers, up to an Nth XOR gate coupled to receive a most significant bit of each of the two digital numbers, further wherein one of the plurality of XOR gates is coupled to receive a parity bit from each of the two digital numbers as an input, the plurality of XOR gates coupled such that at least two discharge paths exist when the two digital numbers are different; and a multiplexor coupled to the memory array and to the compare circuit, wherein the multiplexor is controlled by the compare circuit in response to a comparison of two digital numbers.

11. A compare circuit, comprising:

means for performing a bitwise comparison on two digital numbers;

means for performing a bitwise comparison on parity bits associated with the two digital numbers; and means for generating an output signal that indicates that the two digital numbers are different when the bitwise comparisons indicate that the two numbers are different in response to the bitwise comparison of the two digital numbers and the bitwise comparison of the parity bits, wherein the means for generating the output signal further comprise means for providing at least two discharge paths when the two digital numbers are different.

* * * * *

UNITED STATES PATENT AND TRADEMARK OFFICE
CERTIFICATE OF CORRECTION

PATENT NO.   : 5,881,076
DATED        : March 9, 1999
INVENTOR(S)  : Murray

It is certified that error appears in the above-identified patent and that said Letters Patent is hereby corrected as shown below:

Column 5,
Line 24, delete "commmon" and insert -- common --.

Signed and Sealed this

Thirtieth Day of September, 2003

JAMES E. ROGAN
*Director of the United States Patent and Trademark Office*